Feb. 3, 1942.  W. H. TUCKER  2,271,574
REFRIGERATION
Filed Feb. 9, 1940

INVENTOR
Wilmer H. Tucker
BY
Harry S. Dunass
ATTORNEY

Patented Feb. 3, 1942

2,271,574

UNITED STATES PATENT OFFICE 2,271,574

REFRIGERATION

Wilmer H. Tucker, Canton, Ohio, assignor to The Hoover Company, North Canton, Ohio Application February 9, 1940, Serial No. 318,012

19 Claims. (Cl. 62—119.5)

This invention relates to refrigeration and more particularly to a three-fluid absorption refrigerating apparatus having power means for circulating the mediums in the apparatus.

In modern refrigerating apparatus having a power unit for circulating the mediums in the apparatus, the moving parts of the unit are sometimes sealed within the walls of the apparatus, and it is with apparatuses of this type with which this invention concerns itself. In systems of this type it is necessary to provide some means for lubricating the moving parts of the apparatus for long periods of time so as to avoid the necessity of frequent servicing.

The rotor of the power unit according to the construction here proposed is submerged in a liquid working medium normally contained in the apparatus. Said liquid working medium is utilized to maintain a lubricant in contact with the bearings of the power unit to prevent the gaseous mediums within the apparatus from contacting the lubricant. Thus, the working medium forms a liquid seal making it impossible for refrigerant vapor absorbed in the lubricant to boil off and thus carry some of the lubricant to other parts of the apparatus.

In an absorption refrigerating apparatus using ammonia as the refrigerant, the internal pressures are very high and as a consequence, the walls of the apparatus must be made of high strength steel usually welded together into an integral structure. It can thus be seen that to service power units of such a machine it would be necessary to return the entire unit to the factory.

It is therefore an object of this invention to provide an absorption refrigerating apparatus using ammonia as the refrigerant, and having the moving parts sealed within the system and so constructed that it will be unnecessary to service the power unit during the life of the apparatus.

When a lubricant, such as oil, comes into contact with a refrigerating medium, such as ammonia, under pressure, some of the ammonia vapor is absorbed by the lubricant, and when the pressure is reduced this vapor expands causing the lubricant to boil or foam. When this occurs, some of the lubricant is likely to pass off with the escaping ammonia vapor. Moreover, the total pressures within the system vary considerably between running and idle periods depending upon the duration of the "on" and "off" periods and upon the amount of heat supplied to the boiler during the "off" periods. This desirable mode of operation results in the continual periodic absorption and boiling off of refrigerant vapor and eventually the dispersion of the lubricant to other parts of the apparatus unless some means is provided to prevent it.

It is therefore another object of this invention to provide an absorption refrigerating apparatus with means to prevent the loss of lubricant from the power unit due to factors such as those just discussed whereby the lubricant will be retained in the power unit.

Another object of this invention is to provide an original charge of lubricant which will be sufficient to lubricate the moving parts for the life of the machine and to so construct the parts being lubricated that the lubricant charge cannot possibly escape to other parts of the apparatus throughout the life of the refrigeration apparatus.

Still another object of this invention is to provide an absorption refrigerating apparatus having means for preventing the lubricant from being spilled from the power unit during shipment or other handling operations irrespective of the position in which the apparatus is placed during shipping.

Some refrigerant mediums, such as ammonia, attack iron or steel, of which absorption systems are usually made. A corrosion inhibiter is therefore desirable to protect the iron or steel. This inhibiter should be readily soluble in the absorbent and non-distillable so that it will not be boiled off with the refrigerant and interfere with the operation of the machine.

One such inhibiter is sodium chromate. This has the property of reacting with the steel to form a stainless steel coating which is resistant to further attack by ammonia. Sodium chromate, however, has the disadvantage that it attacks some other metals. Aluminum is a good conductor of electricity and is also resistant to attack by ammonia. It is therefore a good material for the conductor bars and end rings of an induction rotor, but is very susceptible to attack by sodium chromate. Some bearing materials suitable for use in an ammonia atmosphere are also susceptible to attack by sodium chromate.

When a power unit is sealed in the interior of an absorption refrigerating apparatus using such an inhibitor, some means should be provided for preventing this sodium chromate from coming into contact with the power unit and attacking the conductor bars, end rings and bearings. According to this invention, provision is made for admitting only liquid formed by distillation into the power unit. Inasmuch as sodium chromate does not vaporize under the conditions prevailing within the apparatus, it will be readily understood that by this means I am enabled to exclude the inhibiter from the power unit by this simple but highly effective expedient.

It is another object of this invention to provide a refrigerating apparatus with a power unit for circulating the mediums in the apparatus in which the moving parts of the power unit are lubricated by an oil having a lower specific gravity than other liquid mediums in the system and to maintain the lubricant in contact with the moving parts of the power unit by floating the lubricant on such liquids and maintaining it in that position by means of a liquid head of the liquid.

It is another object of this invention to provide a method of lubricating the power unit of an absorption refrigerating apparatus which comprises trapping the lubricant in contact with the moving parts of the power unit and maintaining it in such position by a denser liquid.

Other objects and advantages of this invention will become apparent when taken in connection with the accompanying drawing, in which.

Figure 1:
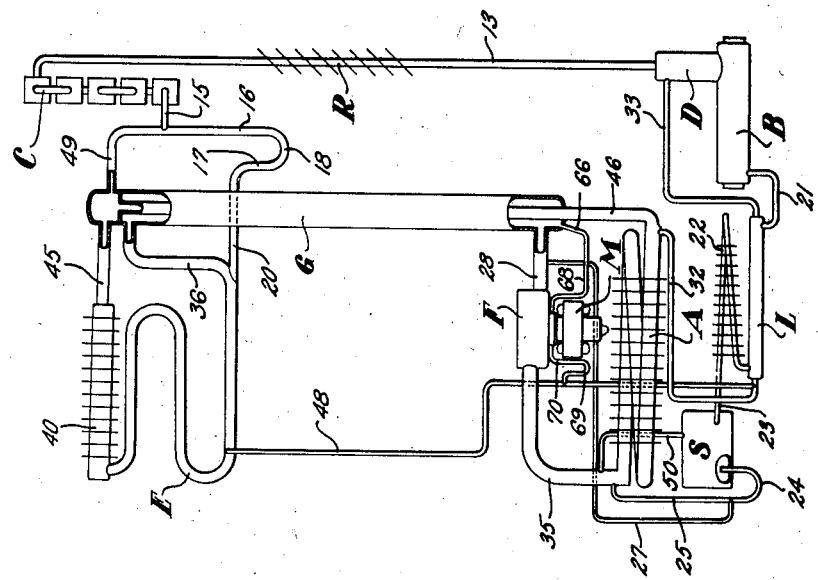
Figure 1 is a diagrammatic representation of an absorption refrigerating apparatus with the power unit of this invention applied thereto.

Referring to Figure 1 of the drawing, there is disclosed a three-fluid absorption refrigerating apparatus comprising a boiler B, an analyzer D, an air-cooled rectifier R, a tubular air-cooled condenser C, an evaporator E, a gas heat exchanger G, a tubular air-cooled absorber A, a solution reservoir S, a liquid heat exchanger L, and a circulating fan F which is driven by an electric motor M.

The above described elements are interconnected by various conduits to form a plurality of gas and liquid circuits constituting a complete refrigerating system to be described in more detail hereinafter.

The refrigerating system will be charged with a suitable refrigerant, such as ammonia, a suitable solvent, such as water, a corrosion inhibiter, such as sodium chromate dissolved therein, and a suitable pressure equalizing medium such as nitrogen.

The boiler B will be heated in a suitable manner as by an electrical heater or by any well known gas burner. The energization of the boiler and motor may be controlled in any suitable manner as by well known control systems.

The application of heat to the boiler B liberates refrigerant vapor from the strong solution contained therein. The vapors so liberated pass upwardly through the analyzer D in counterflow relationship to strong solution flowing downwardly therethrough. Further refrigerant vapor is generated in the analyzer by the heat of condensation of absorption solution which is vaporized in the boiler and condensed in the analyzer. The refrigerant vapor is conducted from the upper portion of the analyzer D to the upper portion of the condenser C through conduit 13 which includes the air-cooled rectifier R wherein vapor of absorption solution passing through the analyzer is condensed and returned to the analyzer through the conduit 13.

The refrigerant vapor is liquefied in the condenser by heat exchange relationship with atmospheric air and is discharged from the bottom portion thereof through a conduit 15 into a downwardly extending conduit 16. The bottom portion of the conduit 16 connects to the bottom portion of an upwardly extending conduit 17 through a U-bend 18. The conduit 16 is appreciably longer than the conduit 17 for a purpose to be described hereinafter. Conduit 17 opens at its upper end into a conduit 20 which discharges into the evaporator in a manner to be described.

The weak solution formed in the boiler by the generation of refrigerant vapor therefrom is conveyed from the boiler through a conduit 21, the outer pass of liquid heat exchanger L, through a pre-cooler 22 and conduit 23 into the solution reservoir S. The weak solution is conveyed from the solution reservoir S through a U-shaped conduit 24 opening into an upwardly extending tube 25 of small diameter, forming a gas lift pump which discharges into the top of the absorber A.

It is evident that the top of the absorber is appreciably above the solution level normally prevailing in the boiler-analyzer reservoir system whereby some means must be provided to elevate the absorption solution to the top of the absorber A. For this purpose a small bleed conduit 27 is connected to the discharge conduit 28 of the circulating fan F and leads to the junction of the conduits 24 and 25 which is below the solution level normally prevailing in the reservoir whereby the weak solution is elevated to the top of the absorber by gas lift action.

In the absorber the weak solution flows downwardly by gravity in counterflow to the rich pressure equalizing medium refrigerant vapor mixture flowing upwardly therethrough. The refrigerant vapor content of the mixture is absorbed into the absorption solution and the heat of absorption is rejected to the surrounding air by air cooling fins which are mounted on the exterior walls of the absorber conduits. The strong solution formed in the absorber discharges into the conduit 32 which opens into the inner pass of the liquid heat exchanger L. From the inner pass of the liquid heat exchanger L the strong solution is conveyed to the upper portion of the analyzer D by conduit 33 whereby it flows downwardly through the analyzer in counterflow to the rising vapors generated in the boiler.

The weak pressure equalizing medium refrigerant vapor mixture present in the absorber A is taken from the upper portion thereof through the conduit 35 into the suction side of the circulating fan F in which it is placed under pressure and discharged through conduit 28 into the outer pass of the gas heat exchanger G and therefrom through downwardly extending conduit 36 into the bottom of the evaporator E.

The conduit 20 opens into the bottom of the conduit 36 whereby the liquid refrigerant supplied to the evaporator enters simultaneously with the pressure equalizing medium which is placed under pressure by the circulating fan F. The diameter of the conduit of the evaporator is relatively small whereby the pressure equalizing medium flows through it at a relatively high velocity. The rapidly flowing pressure equalizing medium sweeps or drags the liquid refrigerant through the evaporator coil as the refrigerant is diffusing into the pressure equalizing medium to produce refrigeration. In the box-cooling portion 40 of the evaporator the velocity of the pressure equalizing medium is relatively slow by reason of the large diameter of that portion and the slower velocity of the pressure equalizing medium, and any remaining liquid refrigerant flows therethrough by gravity as it evaporates.

The rich pressure equalizing medium refrigerant vapor mixture formed in the evaporator is conducted therefrom into the inner pass of the gas heat exchanger G through a conduit 45. The opposite end of the gas heat exchanger G communicates with the bottom portion of the absorber A through a condit 46. In the absorber A the rich pressure equalizing medium refrigerant vapor mixture flows upwardly to counterflow to absorption solution whereby the refrigerant vapor content of the mixture is absorbed by the weak solution.

The bottom coil of evaporator E is provided with a drain conduit 48 which opens into the solution discharge conduit 32. Conduit 48 opens into the top portion of the bottom coil of evaporator whereby it will not completely drain said conduit. The upper portion of the discharge conduit 15 of the condenser is vented through a vent conduit 49 into the inner pass of the gas heat exchanger G. The solution reservoir is vented through a conduit 50 into the suction conduit 35 of the circulating fan.

The circulating fan F places the pressure equalizing medium discharged therefrom under a small pressure in the neighborhood of a few inches of water over that prevailing in the suction side of the fan. In order to prevent this pressure, which also prevails in the conduit 36, from being reflected back through the condenser discharge conduit, the condenser and conduit 13 to the analyzer, conduit 16 is made appreciably longer than conduit 17 whereby a pressure balancing column of liquid is formed in conduit 16 which extends above the point of connection between conduits 17 and 20, a distance sufficient to overcome the pressure produced by the circulating fan in conduit 36.

Leading from the bottom of the outer pass of the gas heat exchanger G is a conduit 66 which opens into the interior of the motor fan casing. The conduit 66 has a U-bend portion 68 for a purpose which will be described in more detail hereinafter. A conduit 70 leads from the interior of the motor fan casing to the conduit 48 and communicates therethrough with the strong solution return conduit 32. The conduit 70 has a U-bend portion 69 for a purpose which will be described in more detail hereinafter.

Figure 2:
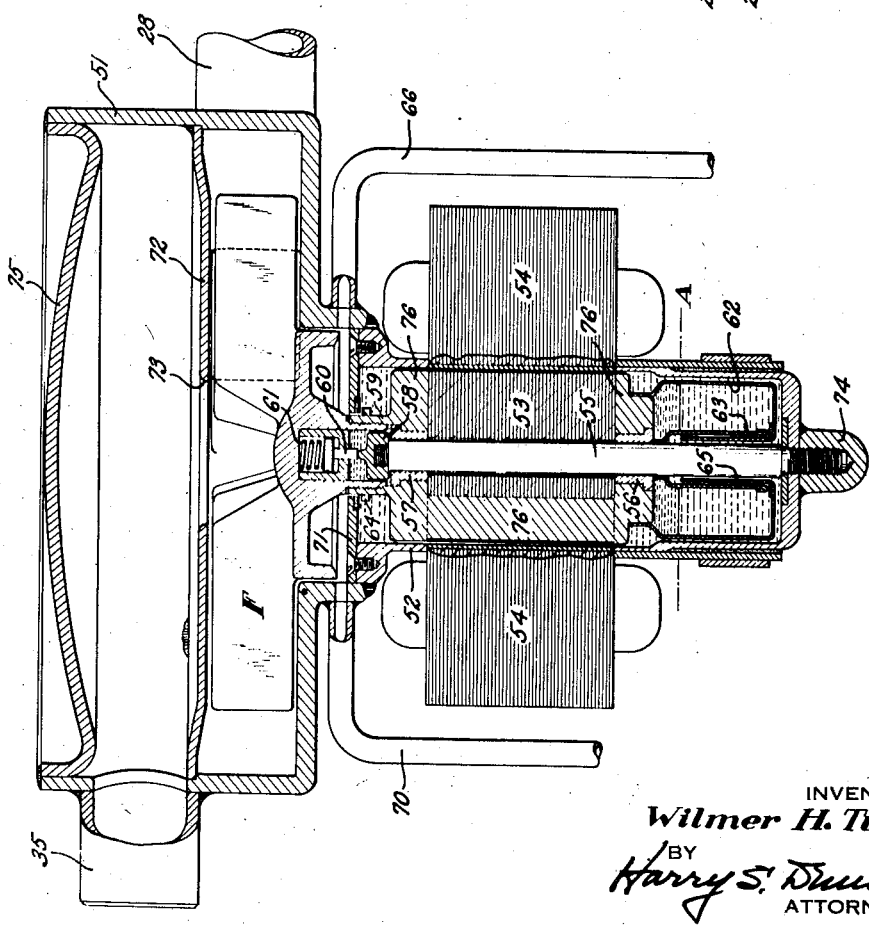
Figure 2 is a sectional view of the motor fan unit of this invention.

Referring to Figure 2 of the drawing, the motor fan unit comprises a casing 51 and a shell 52 welded thereto which separates the motor rotor 53 from the motor field structure 54. The portion of the shell 52 between the rotor and field structure is made very thin to reduce the effective air gap between the rotor and stator and is supported against the high internal pressure of the system by the field structure 54 which is pressed tightly thereover.

The rotor 53 is of hollow construction and is supported for rotation on a fixed shaft 55 rigidly secured to the bottom of the shell 52. The interior of the rotor is provided with radial babbit bearings 56 and 57. The upper end of the shaft 55 is provided with a thrust bearing 58 preferably made of a very hard material such as tungsten carbide. The fan F is secured to the rotor 53 by being threaded into a flange 59 extending therefrom. The lower portion of the hub of the fan is hollowed out and provided with a thrust bearing 60 which is pressed downwardly by spring 61 and cooperates with thrust bearing 58 to support the weight of the rotor 53 and fan F. Rigidly secured to the lower outer periphery of the rotor 53 is a reservoir 62 which extends downwardly adjacent the interior of the shell 52 then inwardly to closely adjacent to shaft 55 and has a portion 65 extending upwardly along shaft 55 to a point slightly below the bottom of rotor 53.

Secured to shaft 55 immediately above the upwardly extending portion 65 of reservoir 62 is an annular member 63 which extends downwardly exteriorly of member 65 to a point adjacent the bottom of reservoir 62. An annular member 64 extends outwardly from the flange 59 closely adjacent cover plate 71 of shell 52. The distance between annular member 64 and cover plate 71 should be the same as the distance between member 63 and the bottom of reservoir 62. The fan casing 51 is divided into a suction chamber and a pressure chamber by plate 72 which has an opening 73 leading to the suction side of the fan.

In assembling the motor fan unit, member 63 is first welded to shaft 55. Shaft 55 is then inserted into bearings 56 and 57, and reservoir 62 is welded thereto. The assembled shaft and rotor may next be inserted axially into shell 52, and the lower end of shaft 55 screw-threaded into nut 74 which is welded to the bottom of shell 52. Thereafter a weak absorption solution is poured into shell 52 about the exterior of rotor 53. When the level of this solution reaches the height of the member 65, the solution will overflow into reservoir 62. Sufficient solution is provided to fill reservoir 62 and shell 52 to the line A, as shown in Figure 2.

A lubricant having a lower specific gravity than the absorption solution or the refrigerant is then poured into the interior of the rotor 53 simultaneously with the introduction of solution on the exterior of the rotor until it is filled to the top of flange 59. It is to be noted that some of this lubricant will flow into the reservoir 62 above the level A. Cover plate 71 may then be secured to the shell 52 as by means of screws. Spring 61 and thrust bearing 60 are next assembled with the fan F and the fan hub is screwed into flange 59 of rotor 53. Plate 72 and cover plate 75 may then be welded in position and casing 51 welded to conduits 28 and 35, as shown in Figure 1 of the drawing. After this the apparatus may be charged in the usual manner.

The strength of spring 61 should be so selected that it will maintain rotor 53 and fan F, when positioned in a vertical position, with the lower edge of member 63 slightly above the bottom of reservoir 62 and member 64 slightly below cover plate 71. Now suppose the motor fan unit is tipped at an angle to the vertical so that the vertical component of the weight of rotor 53 and fan F is less than the force exerted by spring 61. Under these circumstances, rotor 53 will move upwardly causing the lower edge of member 63 to contact the bottom of the reservoir 62 and annular member 64 to contact member 71. As will be apparent, the strength of the spring should be so selected that this condition will exist prior to the time when liquid can overflow from reservoir 62. While some of the liquid may spill from shell 52 during tipping, it will be insufficient to cause any damage as will appear in more detail hereinafter.

During the operation of the apparatus, all of the refrigerant vapor may not be removed from the inert gas in the absorber A so that the gaseous medium leaving the absorber is a lean warm mixture of refrigerant vapor and the inert medium. This mixture comes into heat exchange relationship with the relatively cold mixture returning to the absorber from the evaporator and becomes cold and refrigerant or absorbtion vapors therein condenses. Such condensate collects in the bottom of the outer pass of gas heat exchanger G and flows through conduit 66 into casing 52 until this casing becomes filled to the level of conduit 70, after which it will overflow through conduit 78 back to the solution circuit.

Since the pressure in conduit 28 is the same as on the high pressure side of the fan, and since the pressure within the shell 52 is a somewhat lower pressure, the liquid level in the right hand leg of the U-member 68 will be lower than the level within the motor fan casing by an amount sufficient to balance this difference in pressure. The pressure in conduit 48 being somewhat higher than the pressure in the shell 52, the right hand leg of the U-tube 69 is made longer than the left hand leg by an amount sufficient to provide a liquid column to counter-balance this difference in pressure.

The sodium chromate corrosion inhibiter is not distillable and therefore can never reach the gas heat exchanger G. It will thus be evident that none of this corrosion inhibiter can come into contact with the aluminum conductor bars and end rings 76 of rotor 53. At the same time, the rotor is completely submerged in one or more of the liquid mediums within the apparatus, and such liquid is utilized to maintain the lubricant trapped in the hollow rotor to lubricate the bearings thereof.

By submerging rotor 53 in a liquid medium, the rotor centers itself as it reaches its operating speed. This is due to the fact that if the rotor is off-center when starting, the liquid will tend to rotate with the rotor and be drawn between rotor 53 and shell 52 at the point where the rotor is closest to the shell. This results in the rotor being moved away from the shell at that point. This action continues until the rotor is completely centralized. Even when the rotor is centralized, it will be noted that the space between the rotor and shell is very small and may be only a few thousandths of an inch.

The fact that the action of the liquid medium in which the rotor is submerged automatically centers the rotor renders it possible to make the clearance between radial bearings 56 and 57 and shaft 55 greater than would otherwise be possible. Thus the shaft and the bearing surfaces may be in contact only when the rotor is starting, thus reducing the wear thereon to a negligible amount and tremendously increasing the life of the bearings.

The buoyant effect of the liquid medium will also lighten the load on thrust bearings 58 and 60, and thereby reduce the wear thereon. Furthermore, since the radial bearings are out of contact with the shaft during operation, a much quieter motor will result.

It is to be noted that the entire unit can be up-ended and that no liquid will be spilled from hollow rotor 53 since before any liquid is spilled from the reservoir 62, member 63 will contact the bottom of reservoir 62 and prevent the liquid from spilling regardless of how much farther the unit is tipped. At the same time, member 64 will contact cover plate 71 and prevent liquid from spilling from shell 52 except possibly a little at the start of the tipping operation.

Now assuming that the unit is completely inverted, seals 64 and 63 will remain closed and the liquid medium in the shell will be retained therein as well as the lubricant and the absorption solution in the hollow rotor 53 and reservoir 62. If the unit is allowed to set for a sufficient time in tipped position, the lubricant, being lighter than the absorption solution, will rise to the top and thus assume a position in the normally bottom part of reservoir 62. When the apparatus is again righted to its upright position, seals 64 and 63 will eventually open but since absorption solution still remains in the shell 52, no liquid can spill out of reservoir 62 regardless of the rate at which the apparatus is righted to its upright position due to the fact that the solution in shell 52 is heavier than the oil in reservoir 62. The lubricant will eventually again assume its position in the interior of the hollow rotor and be available for the lubrication of the bearings when the motor is started. It is to be noted that since the absorption solution is heavier than the lubricant, that the lubricant level in the hollow rotor will be maintained higher than that in the shell 52 so as to assure sufficient lubrication of thrust bearings 58 and 60.

If an absorption refrigerating apparatus of the type under consideration stands idle for long periods of time, for instance in a 70° room, the internal pressure goes down to approximately 270 pounds per square inch. When the apparatus is in operation the pressure rises to approximately 325 to 345 pounds per square inch, depending upon the operating conditions. This latter pressure varies considerably between running and idle periods and when the machine is shut down the pressure in the system will go down considerably below that prevailing in the system during full operating conditions. Some of the ammonia vapor will undoubtedly be absorbed in the lubricant but since this lubricant is completely enclosed in the hollow rotor 53, no lubricant can be carried away by the escaping ammonia vapor when the pressure is reduced and the original charge of lubricant will remain trapped in hollow rotor 53. Upon a decrease in the system pressure some of the refrigerant vapor may evaporate and form a gas pocket in the upper end of the hollow rotor, but this vapor will be immediately absorbed when the pressure again rises.

If desired, members 62 and 71 may be provided with a soft packing material to form more efficient seals between the reservoir 62 and shell 52 and between the shell 52 and casing 51. Since the pressures on opposite sides of these seals are equalized at all times, the sealing devices need only be made to seal against a very slight head of liquid. Hence, packing material is not essential.

The hollow rotor may be filled with a lubricant which is fluid at all times or one which is solid at ordinary temperatures and fluid at the operating temperature of the motor. In the latter case the seals 63 and 64 may be omitted since the lubricant will be solidified during shipment or other handling operations and thus will not be spilled from the interior of the hollow rotor 53. If desired the seal 64 may be eliminated since it is not essential that the liquid medium be maintained in the shell 52 when the apparatus is tipped.

From the foregoing it can be seen that this invention provides an absorption refrigerating apparatus having power means for circulating the mediums in the apparatus in which the original charge of lubricant will be trapped in position to lubricate the moving parts of the apparatus throughout the life of the apparatus, in which the lubricant is held in its proper position by a liquid column of liquid mediums normally present in the apparatus; in which the lubricant cannot be carried away by escaping refrigerant vapors when the pressure in the system goes down; and in which the lubricant will be maintained in its proper position regardless of the position in which the apparatus is placed during shipment or other handling operations.

While I have shown but a single embodiment of my invention it is to be understood that this embodiment is to be taken as illustrative only and not in a limiting sense. I do not wish to be limited to the specific structure shown and described but to include all equivalent variations thereof except as limited by the scope of the claims.

I claim:

1. An absorption refrigerating apparatus including an evaporator and an absorber, conduits including a heat exchanger connecting the evaporator and absorber to form a closed circuit therebetween, said apparatus being charged with a refrigerant, an absorption solution having a corrosion inhibiter dissolved therein, and an inert pressure equalizing medium, said apparatus being characterized by the provision of a power unit for circulating the mediums in the apparatus, said power unit including a lubricant pocket containing a lubricant having a lower specific gravity than said refrigerant or absorption solution, and means for leading condensate from the heat exchanger to the power unit, said lubricant pocket being so constructed and arranged that the lubricant will float on the condensate and be elevated into said lubricant pocket.

2. In combination, an absorption refrigerating apparatus, a power unit for circulating the mediums in said apparatus, said apparatus being charged with a refrigerant, an absorption solution, and a lubricant of lower specific gravity than the refrigerant or the absorption solution, said power unit including a pocket closed at its upper end, and means for supplying a liquid medium present in said apparatus to the lower end of said pocket whereby the lubricant is maintained in the pocket by being floated on said liquid medium.

3. In combination, an absorption refrigerating apparatus of the pressure equalized type, a power unit for circulating a medium in the apparatus, said power unit including a lubricant pocket, closed at its upper portion from the remainder of the apparatus, and means for leading a liquid medium with which said apparatus is charged to the lower portion of said pocket whereby the lubricant is maintained in the pocket.

4. In combination, a refrigerating apparatus, a power unit, said apparatus being charged with a refrigerant, said power unit comprising a vertically extending casing for housing a motor rotor and fan and a hollow rotor interiorly supported for rotation on a fixed shaft, said hollow rotor being closed at its upper end and having an opening at its lower end, a reservoir attached to the open end of said hollow rotor and surrounding said shaft, said hollow rotor being charged with a lubricant having a lower specific gravity than the refrigerant and means to trap refrigerant in the casing on the exterior of said hollow rotor, said reservoir being of sufficient size to contain the lubricant in the hollow rotor whereby the lubricant will float on the refrigerant during operation and will be trapped in the reservoir when the refrigerant is drained from the casing.

5. In combination, a refrigerating apparatus, a power unit, said apparatus being charged with a refrigerant, said power unit including a vertically extending casing and a hollow rotor supported therein on a yielding thrust bearing whereby the rotor will move axially when the power unit is moved from the vertical position, a lubricant in said hollow rotor, means for leading refrigerant to said casing whereby the rotor is submerged in the refrigerant, said rotor and casing being so constructed that the hollow rotor will be sealed from the casing and the casing will be sealed from the remainder of the apparatus when the rotor moves axially whereby the lubricant will be retained in the hollow rotor and refrigerant in the casing when the apparatus is tipped from a vertical position.

6. In combination, an absorption refrigerating apparatus, a power unit for circulating a medium in the apparatus, said power unit comprising a vertical casing for housing a motor rotor and fan, a fixed shaft for rotatably supporting said rotor, said rotor having a bearing pocket surrounding said shaft and including a closed upper end, lubricant in said pocket having a lower specific gravity than the liquid mediums normally contained in the apparatus and means for leading a liquid medium normally present in said apparatus to said casing whereby the lubricant is maintained in said pocket by being floated on said liquid medium.

7. In combination, a refrigerating apparatus, a power unit, said apparatus being charged with a refrigerant, said power unit including a casing and a hollow rotor supported therein, said hollow rotor containing a lubricant, means for leading refrigerant to said casing whereby the rotor is submerged in the refrigerant, means for preventing escape of lubricant from the hollow rotor to said casing and means for preventing the escape of refrigerant from the casing to other parts of the apparatus.

8. In combination, a refrigerating apparatus, a power unit, said apparatus being charged with a refrigerant, said power unit including a casing and a hollow rotor supported therein, said hollow rotor containing a lubricant, means for leading refrigerant to said casing whereby the rotor is submerged in the refrigerant, means for preventing the escape of lubricant from the hollow rotor to said casing and means for preventing the escape of refrigerant from the casing to other parts of the apparatus, both of said last mentioned means being responsive to the weight of said rotor.

9. In combination, a refrigerating apparatus, a power unit, said apparatus being charged with a liquid medium, said power unit including a hollow rotor with a closed upper end and an open lower end, a lubricant in said hollow rotor having a lower specific gravity than said liquid and means for trapping said liquid between the open end of said rotor and the remainder of the apparatus whereby the lubricant is maintained in the hollow rotor by being floated on the liquid medium.

10. In combination, an absorption refrigerating apparatus, a power unit, said apparatus being charged with a liquid medium and a lubricant of lower specific gravity than the liquid medium, said power unit including a pocket for receiving said lubricant and having an entrance point for liquid medium and means for maintaining said lubricant in said pocket by floating it on said liquid medium said pocket being closed from other parts of said apparatus except for the entrance point for said liquid medium.

11. In combination, a refrigerating apparatus, a power unit, said power unit including a vertical casing with a rotor supported therein, said rotor being submerged in a liquid within the apparatus, and means responsive to the weight of the rotor for closing the casing from other parts of the apparatus.

12. In combination, a refrigerating apparatus, a power unit, said power unit comprising a vertical casing having a hollow rotor with a closed upper end and an open lower end, said rotor being so supported for rotation that it will move axially when the casing is moved from a vertical position, said hollow rotor containing a lubricant and means for closing the open end of said hollow rotor when the rotor moves axially.

13. In combination, a refrigerating apparatus, a power unit, a lubricant pocket associated with said power unit and means responsive to the weight of a portion of said power unit for sealing the pocket from the remainder of the apparatus.

14. The method of lubricating the power unit of an absorption refrigerating apparatus comprising, trapping lubricant in a position to lubricate the moving parts of the power unit and maintaining the lubricant in its trapped position by floating it on a liquid medium normally contained in the apparatus.

15. The method of lubricating the power unit of an absorption refrigerating apparatus comprising, trapping the lubricant in a position to lubricate the moving parts in the power unit and maintaining the lubricant in its trapped position by means of a liquid head of the refrigerant normally contained in the apparatus.

16. The method of protecting the lubricant of the power unit of an absorption refrigerating apparatus from coming into contact with the vapors or gaseous mediums in the apparatus comprising, trapping lubricant in a position to lubricate the moving parts of a power unit and providing a liquid seal between the lubricant and the vapors or gaseous mediums.

17. The method of lubricating the power unit of an absorption refrigerating apparatus of the type using a refrigerant and a non-distillable corrosion inhibitor dissolved in the absorption solution comprising, heating the refrigerant and absorption solution to vaporize a portion thereof, condensing a portion of the vaporized mediums to form condensate free of said inhibitor, trapping lubricant in a position to lubricate the moving parts of the power unit by said condensate, and maintaining the lubricant in the trapped position by a liquid head of said condensate.

18. In combination, an absorption refrigerating apparatus, a power unit, said apparatus being charged with a refrigerant medium, said power unit including means for trapping lubricant in a position to lubricate the moving parts thereof, said lubricant having a lower specific gravity than the refrigerant and means for maintaining a liquid head of said medium to hold the lubricant in its trapped position.

19. An absorption refrigerating apparatus comprising, a boiler, an evaporator and an absorber, conduits connecting said evaporator and absorber to form a circuit therebetween, conduits connecting the boiler and absorber to form a closed circuit therebetween, said apparatus being charged with a refrigerant, an absorbent, an inert pressure equalizing medium and with a chromate corrosion inhibitor dissolved in the absorbent, and power operated means including a movable element for circulating at least one of said mediums in its circuit, said power operated means having a lubricant held in a position to lubricate the movable element thereof and being positioned in one of said circuits at a point inaccessible to solution containing the inhibitor whereby the movable element and lubricant will not be adversely affected by the inhibitor.

WILMER H. TUCKER.